US011795990B2

(12) United States Patent
Ding et al.

(10) Patent No.: US 11,795,990 B2
(45) Date of Patent: Oct. 24, 2023

(54) ANTI-LOOSENING SCREW PAIR AND ANTI-LOOSENING SCREW COMPONENT

(71) Applicant: Beijing Institute of Technology, Beijing (CN)

(72) Inventors: Xiaoyu Ding, Beijing (CN); Jianhua Liu, Beijing (CN); Hao Gong, Beijing (CN)

(73) Assignee: Beijing Institute of Technology, Beijing (CN)

( * ) Notice: Subject to any disclaimer, the term of this patent is extended or adjusted under 35 U.S.C. 154(b) by 119 days.

(21) Appl. No.: 17/586,503

(22) Filed: Jan. 27, 2022

(65) Prior Publication Data

US 2022/0145927 A1 May 12, 2022

Related U.S. Application Data

(63) Continuation of application No. 16/079,950, filed as application No. PCT/CN2018/072390 on Jan. 12, 2018, now Pat. No. 11,268,564.

(30) Foreign Application Priority Data

Dec. 15, 2017 (CN) .......................... 201711346723.7
Dec. 27, 2017 (CN) .......................... 201711443249.X

(51) Int. Cl.
*F16B 39/30* (2006.01)

(52) U.S. Cl.
CPC .................................. *F16B 39/30* (2013.01)

(58) Field of Classification Search
CPC ........ F16B 25/00; F16B 33/00; F16B 33/002; F16B 33/02; F16B 39/00; F16B 39/30; Y10S 411/929; Y10S 411/938

(Continued)

(56) References Cited

U.S. PATENT DOCUMENTS 2,581,690 A * 1/1952 Moehle ................... F16B 33/02
                                                              470/198
4,024,899 A * 5/1977 Stewart ................... F16B 39/30
                                                              411/277

(Continued)

FOREIGN PATENT DOCUMENTS

| CN | 103328835 A | 9/2013 |
| DE | 3920678 A1 | 1/1991 |
| EP | 2224143 B1 | 4/2015 |

OTHER PUBLICATIONS

European Search Report European Patent Office, dated Oct. 9, 2019, PCT/CN2018072390, Applicant: Beijing Institute of Technology.

(Continued)

*Primary Examiner* — Roberta S Delisle
(74) *Attorney, Agent, or Firm* — K&L Gates LLP

(57) ABSTRACT

The present disclosure provides an anti-loosening screw pair and an anti-loosening screw component. The screw pair includes a first screw component provided with a first screw thread and a second screw component whose outer wall surface is provided with a second screw thread. The first and second screw components are in threaded connection. In a direction of the first screw component being screwed into the second screw component, sides of the first and second screw threads pressing against each other are formed into force-bearing fitting faces respectively, and opposite sides thereof are formed into non-force-bearing fitting regions respectively. At least one of the force-bearing fitting faces and the non-force-bearing fitting regions of the first and the second screw components is provided with a stopper so as to prevent radial displacement between the first and the second screw components.

18 Claims, 10 Drawing Sheets

(58) Field of Classification Search
USPC .................. 411/259, 308, 310, 311, 411, 436
See application file for complete search history.

(56) References Cited

U.S. PATENT DOCUMENTS

| | | | |
|---|---|---|---|
| 4,252,168 A * | 2/1981 | Capuano .................. | F16B 39/30 411/311 |
| 5,672,037 A * | 9/1997 | Iwata ...................... | F16B 39/30 411/311 |
| 6,190,101 B1 | 2/2001 | Janitzki | |
| 6,386,927 B2 * | 5/2002 | Nakayama ............... | H01R 4/26 411/310 |
| 6,669,424 B1 | 12/2003 | Bauer | |
| 6,726,689 B2 * | 4/2004 | Jackson ................ | F16B 35/047 606/916 |
| 7,281,925 B2 * | 10/2007 | Hall ...................... | A61C 8/0022 606/314 |
| 7,722,304 B2 | 5/2010 | Pritchard | |
| 8,876,868 B2 * | 11/2014 | Jackson ............. | A61B 17/7032 606/273 |
| 8,905,694 B2 | 12/2014 | Esper | |
| 2007/0237604 A1 | 10/2007 | Janitzki | |
| 2013/0236266 A1 | 9/2013 | Esper | |
| 2016/0091012 A1 | 3/2016 | Kondo | |
| 2022/0145927 A1 * | 5/2022 | Ding ....................... | F16B 39/30 |

OTHER PUBLICATIONS

Written Opinion of the International Searching Authority for PCT/CN2018/072390.

* cited by examiner

ANTI-LOOSENING SCREW PAIR AND ANTI-LOOSENING SCREW COMPONENT

CROSS-REFERENCE TO RELATED APPLICATION

The present application is a continuation application claiming priority under 35 U.S.C. § 120 to U.S. patent application Ser. No. 16/079,950, filed on Aug. 24, 2018, which is a U.S. National Stage Entry under 35 U.S.C. § 371 of International Patent Application No. PCT/CN2018/072390, filed on Jan. 12, 2018, which claims priority to Chinese Patent Applications No. 201711443249.X filed on Dec. 27, 2017 and Chinese Patent Applications No. 201711346723.7 filed on Dec. 15, 2017, the disclosures of which are incorporated in their entireties by reference herein.

TECHNICAL FIELD

The present disclosure relates to the field of mechanical connection technology, and in particularly to an anti-loosening screw pair and an anti-loosening screw component.

BACKGROUND

Threaded connection is one of the most widely used connecting methods in such industries as machinery, construction, transportation, aerospace, shipping, furniture etc., the threaded connection may generate a great connecting force, is easy for repeated assembly and disassembly, and easy to be produced in enormous quantities as well as with lower cost.

However, in complex working conditions (e.g., vibration, impact, alternating temperature etc.), the threaded connection is prone to loose and fail. Thread looseness not only reduces the connecting force, but also induces an integral fracture of a threaded connection structure component (e.g., bolt), thereby causing severe safety incidents.

SUMMARY

In view of the foregoing, the present disclosure provides an anti-loosening screw pair and an anti-loosening screw component.

To solve the above technical problem, the present disclosure adopts the following technical solutions.

An anti-loosening screw pair according to a first aspect of the present disclosure includes:
 a first screw component having an inner hole, an inner wall surface of the inner hole being provided with a first screw thread extending along a spiral line thereof; and
 a second screw component having a rod-shaped structure, an outer wall surface of the rod-shaped structure being provided with a second screw thread extending along a spiral line thereof and corresponding to the first screw thread, and the second screw component being in threaded connection with the first screw component,
 wherein in a direction of the first screw component being screwed into the second screw component, sides of the first screw thread and the second screw thread pressing against each other are formed into force-bearing fitting faces respectively, opposite sides thereof are formed into non-force-bearing fitting regions respectively, and at least one of the force-bearing fitting faces and the non-force-bearing fitting regions (including a force-bearing fitting face and a non-force-bearing fitting region of the first screw component, a force-bearing fitting face and a non-force-bearing fitting region of the second screw component) of the first screw component and the second screw component is provided with a stopper so as to prevent radial displacement between the first screw component and the second screw component.

Optionally, the force-bearing fitting face of the first screw component and/or the second screw component is provided with the stopper.

Optionally, one of the first screw component and the second screw component is provided with the stopper.

Optionally, the force-bearing fitting face of the first screw thread is provided with the stopper.

Optionally, the stopper comprises a protrusion protruding toward the force-bearing fitting face of the second screw thread, the protrusion presses against the force-bearing fitting face of the second screw thread as the first screw component and the second screw component are being screwed together so as to form a groove therein, and the protrusion is engaged with the groove so as to prevent the radial displacement between the first screw component and the second screw component.

Optionally, the stopper comprises one or more protrusions.

Optionally, the first screw component and the second screw component are provided with the stoppers respectively.

Optionally, the stopper includes a first fitting portion arranged on the first screw component and a second fitting portion arranged on the second screw component, and the first fitting portion is engaged with the second fitting portion so as to prevent the radial displacement between the first screw component and the second screw component.

Optionally, the first fitting portion comprises a protrusion arranged on the first screw thread, the second fitting portion comprises a groove arranged in the second screw thread, and the protrusion is clipped into the groove.

Optionally, the first fitting portion comprises a groove arranged in the first screw thread, the second fitting portion comprises a protrusion arranged on the second screw thread, and the protrusion is clipped into the groove.

Optionally, the first fitting portion comprises both a protrusion arranged on the first screw thread and a groove arranged in the first screw thread, the second fitting portion comprises both a groove arranged in the second screw thread and a protrusion arranged on the second screw thread, the protrusion on the first screw thread is clipped into the groove in the second screw thread, and the protrusion on the second screw thread is clipped into the groove in the first screw thread.

Optionally, a fitting clearance is presented between the protrusion and the groove engaged therewith.

Optionally, a shape of the protrusion corresponds to that of the groove engaged therewith, and the protrusion is closely engaged with the groove.

Optionally, one or more protrusions and one or more grooves are provided.

Optionally, the first fitting portion comprises a first stepped portion arranged on the first screw component, and the second fitting portion comprises a second stepped portion arranged on the second screw component.

Optionally, the first fitting portion comprises one or more first stepped portions.

Optionally, the non-force-bearing fitting region of the first screw component and/or the second screw component is provided with the stopper.

Optionally, the non-force-bearing fitting regions of the first screw component and the second screw component are provided with the stoppers respectively.

Optionally, the stopper includes a third fitting portion arranged on the first screw component and a fourth fitting portion arranged on the second screw component, and the third fitting portion is engaged with the fourth fitting portion so as to prevent the radial displacement between the first screw component and the second screw component.

Optionally, the third fitting portion comprises a protrusion arranged on the first screw thread, the fourth fitting portion comprises a groove arranged in the second screw thread, and the protrusion is clipped into the groove.

Optionally, the third fitting portion comprises a groove arranged in the first screw thread, the fourth fitting portion comprises a protrusion arranged on the second screw thread, and the protrusion is clipped into the groove.

Optionally, the third fitting portion comprises both a protrusion arranged on the first screw thread and a groove arranged in the first screw thread, the fourth fitting portion comprises a groove arranged in the second screw thread and a protrusion arranged on the second screw thread, the protrusion on the first screw thread is clipped into the groove in the second screw thread, and the protrusion on the second screw thread is clipped into the groove in the first screw thread.

Optionally, a fitting clearance is presented between the protrusion and the groove engaged therewith.

Optionally, a shape of the protrusion corresponds to that of the groove engaged therewith, and the protrusion is closely engaged with the groove.

Optionally, one or more protrusions and one or more grooves are provided.

Optionally, the force-bearing fitting face and the non-force-bearing fitting region of the first screw component and/or the second screw component are provided with the stoppers respectively.

An anti-loosening screw component according to a second aspect of the present disclosure includes both the first screw component and the second screw component according to the embodiments of the first aspect, wherein the force-bearing fitting face and/or the non-force-bearing fitting region of the first screw component or the second screw component is provided with the stopper.

Optionally, the anti-loosening screw component comprises the first screw component, and the force-bearing fitting face and/or the non-force-bearing fitting region of the first screw component is provided with the stopper.

Optionally, the anti-loosening screw component comprises the second screw component, and the force-bearing fitting face and/or the non-force-bearing fitting region of the second screw component is provided with the stopper.

Advantageous effects of the above technical solutions of the present disclosure are as follows.

By arranging the stopper on at least one of the force-bearing fitting faces and the non-force-bearing fitting regions of the first screw component and the second screw component, the anti-loosening screw pair according to embodiments of the present disclosure effectively prevents radial displacement between thread fitting faces of the first screw component and the second screw component. The anti-loosening screw component according to the embodiments of the present disclosure may be used in combination to compose the above anti-loosening screw pair, or be independently used as anti-loosening structures respectively.

BRIEF DESCRIPTION OF THE DRAWINGS

In order to describe technical solutions in embodiments of the present disclosure or in the related arts more clearly, attached drawings used for describing the embodiments will be briefly described hereinafter. Obviously, the drawings referenced in the following description are merely shown some of the embodiments of the present disclosure, and a person skilled in the art may also obtain other drawings from those described ones without paying any creative labor.

DETAILED DESCRIPTION

Figure 1:
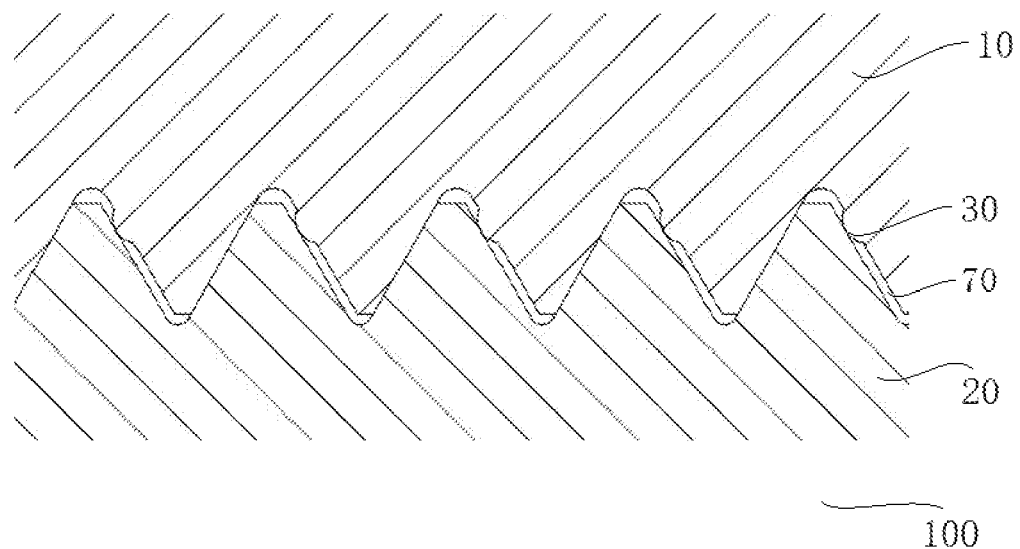
FIG. 1 is a sectional view of an anti-loosening screw pair according to a first embodiment of the present disclosure.

In order to clarify the objects, technical solutions and advantages of the embodiments of the present disclosure, technical solutions of the embodiments will be clearly and completely described hereinafter in conjunction with the drawings thereof. Obviously, the described embodiments are merely parts of, rather than all of, the embodiments of the present disclosure. Based on the described embodiments of the present disclosure, all of other embodiments obtained by a person skilled in the art shall also fall within the protection scope of the present disclosure.

An anti-loosening screw pair 100 according to a first aspect of the present disclosure will be specifically described hereinafter in conjunction with the drawings.

As shown in FIG. 1 to FIG. 20, the anti-loosening screw pair 100 according to an embodiment of the first aspect includes a first screw component 10 and a second screw component 20.

The first screw component 10 has an inner hole, and an inner wall surface of the inner hole is provided with a first screw thread extending along its spiral line. The second screw component 20 has a rod-shaped structure, and an outer wall surface of the rod-shaped structure is provided with a second screw thread extending along its spiral line and corresponding to the first screw thread. The second screw component 20 is in threaded connection with the first screw component 10. In a direction of the first screw component 10 being screwed into the second screw component 20, sides of each of the first screw thread and the second screw thread pressing against each other are formed into force-bearing fitting faces respectively, and opposite sides thereof are formed into non-force-bearing fitting regions respectively. At least one of the force-bearing fitting faces and the non-force-bearing fitting regions (including a force-bearing fitting face and a non-force-bearing fitting region of the first screw component 10 as well as a force-bearing fitting face and a non-force-bearing fitting region of the second screw component 20) of each of the first screw component 10 and the second screw component 20 is provided with a stopper so as to prevent radial displacement between the first screw component 10 and the second screw component 20.

The anti-loosening screw pair 100 according to the present embodiment mainly consists of the first screw component 10 and the second screw component 20. The inner hole may be formed inside the first screw component 10, and the first screw thread extending along its spiral line may be formed on the inner wall surface of the inner hole. The second screw component 20 may comprise a rod-shaped structure, and the second screw thread extending along its spiral line may be formed on the outer wall surface of the rod-shaped structure. The second screw thread and the first screw thread may correspond to each other.

The second screw component 20 may be in threaded connection with the first screw component 10. When the anti-loosening screw pair 100 is being tightened, an interacting force may be formed between the first screw component 10 and the second screw component 20, and the interacting force may include a pressing force and a frictional force. In such a case, in the direction of the first screw component 10 being screwed into the second screw component 20, sides of the first screw thread and the second screw thread pressing against each other may be formed into force-bearing fitting faces respectively, and the interacting force formed between the first screw component 10 and the second screw component 20 is mainly generated on the force-bearing fitting faces.

Sides of the first screw thread and the second screw thread opposite to the force-bearing fitting faces are formed into non-force-bearing fitting regions respectively. In the non-force-bearing fitting regions, there may be a geometrical matching relationship between the first screw component 10 and the second screw component 20, but obvious interaction force may not be produced therebetween. In addition, in the non-force-bearing fitting regions, physical contact may not be generated between the first screw component 10 and the second screw component 20, but can present therebetween a certain fitting clearance 70.

The stopper may be formed on at least one of the force-bearing fitting faces and the non-force-bearing fitting regions of the first screw component 10 and the second screw component 20, and radial displacement between the first screw component 10 and the second screw component 20 may be prevented by the formed stopper.

It should be noted that, in the embodiments of the present disclosure, screw thread refers to a tooth body which has some sort of thread profile and protrudes periodically along its spiral line on a surface of a revolving body such as a column, a cone or others. The thread profile is a sectional profile shape of the screw thread in a plane through an axis of the above column, cone or other revolving bodies. Ordinary thread profile includes triangular, trapezoidal, rectangular and zigzag shapes etc. The screw thread may be either left-handed or right-handed, and may be either single-threading or multi-threading.

A screw pair usually includes an internal thread and an external thread (simply as "internal and external threads"), as for the present embodiment, the screw pair includes the first screw component 10 and the second screw component 20, so that the thread arranged on the wall surface of the inner hole (the inner hole is in a shape of a revolving body such as a column, a cone or others) of the first screw component 10 may be expressed as an internal thread, and the thread arranged on the external surface of the rod-shaped structure (the rod-shaped structure is also in a shape of a revolving body such as a column, a cone or others) of the second screw component 20 may be expressed as an external thread. Central axes of the revolving body features in the shape of a column, a cone or others included in the first screw component 10 and the second screw component 20 are referred to as axes of the first screw component 10 and of the second screw component 20, and ideally, the axis of the first screw component 10 and the axis of the second screw component 20 are coincide with each other. A direction perpendicular to the axis of the first screw component 10 is called a radial direction of the first screw component 10, and a direction perpendicular to the axis of the second screw component 20 is called a radial direction of the second screw component 20.

It should be noted that, the first screw component 10 may be represented as a complete part including an internal thread, such as a screw nut, a screw cap or others, and may also be represented as a partial region on a complex structure including an internal thread feature, such as a partial region on an engine cylinder block provided with an internal thread, or a partial region on a large bridge structure provided with an internal thread, all of which may be regarded as the first screw component 10. In a word, as long as an internal thread feature is included, whether a complete part or a partial region on a structure can both be regarded as the first screw component 10. Meanwhile, the second screw component 20 may be represented as a complete part including an external thread, such as a bolt, a screw nail or others, and may also be represented as a partial region on a complex structure including an external thread feature, for example, end regions on some engine spindles provided with an external thread, all of which may also be regarded as the second screw component 20. In a word, as long as an external thread feature is included, whether a complete part or a partial region on a structure can both be regarded as the second screw component 20.

After the screw pair is tightened, an interaction force, including a pressing force and a frictional force, will be formed between the internal and external threads. After the screw pair is tightened, the force-bearing fitting faces will be formed on the internal and external threads, and the interaction force between the internal and external threads is mainly acted on the force-bearing fitting faces.

After the screw pair is tightened, besides the force-bearing fitting faces, sides of the internal and external threads opposite to the force-bearing fitting faces are called non-force-bearing fitting regions. In the non-force-bearing fitting regions, there is a geometrical matching relationship between the internal and external threads, but an obvious interaction force will not necessarily be generated therebetween. In the non-force-bearing fitting regions, physical contact may not be generated between the internal and external threads, but instead, a certain fitting clearance 70 may be presented.

In the embodiments of the present disclosure, the force-bearing fitting faces are also called thread fitting faces, or fitting faces for short. Fitting faces formed by engagement between ordinary internal and external threads is usually flat surfaces, but the fitting faces of the screw pair including the screw threads according to the present disclosure may be curved surfaces.

The radial displacement described in the embodiments of the present disclosure may cause the axis of the first screw component 10 and the axis of the second screw component 20 deviate from their normal coincident locations. In other words, the radial displacement described in the embodiments of the present disclosure may approximately cause the first screw component 10 and the second screw component 20 respectively displaced or laterally displaced in directions perpendicular to their axes.

Thus, by arranging the stopper on at least one of the force-bearing fitting faces and the non-force-bearing fitting regions of the first screw component 10 and the second screw component 20, the anti-loosening screw pair 100 according to the present embodiment effectively prevents the radial displacement between the first screw component 10 and the second screw component 20 so as to increase connection tightness of the anti-loosening screw pair 100. The anti-loosening screw pair 100 is thereby easy to be disassembled, convenient for repeatedly usage, and has high fatigue strength, appropriate tightening torque as well as a wider application range.

According to one embodiment of the present disclosure, the force-bearing fitting face of the first screw component 10 and/or the second screw component 20 is provided with the stopper.

The stopper may be formed on the force-bearing fitting face of the first screw component 10, and may also be formed on the force-bearing fitting face of the second screw component 20. The stopper may also be formed on the force-bearing fitting faces of both of the first screw component 10 and the second screw component 20 so as to effectively prevent the radial displacement in the anti-loosening screw pair 100.

In some specific embodiments of the present disclosure, one of the first screw component 10 and the second screw component 20 is provided with the stopper.

The stopper may be formed on the force-bearing fitting face of the first screw component 10 or on the force-bearing fitting face of the second screw component 20 to prevent the radial displacement in the anti-loosening screw pair 100.

Figure 2:
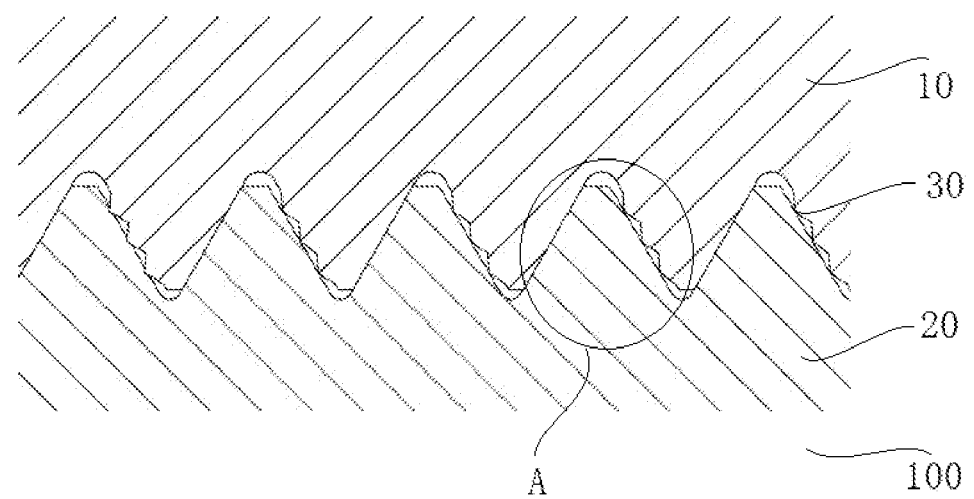
FIG. 2 is another sectional view of the anti-loosening screw pair according to the first embodiment of the present disclosure.
Figure 3:
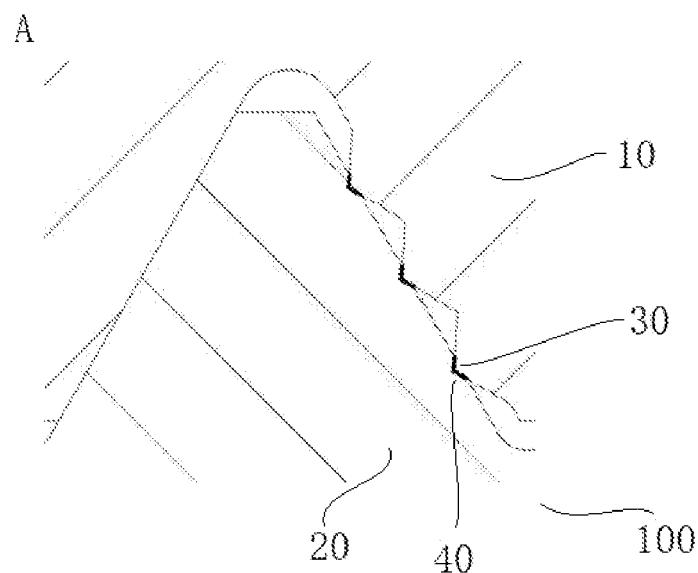
FIG. 3 is a partial enlarged view of section A in FIG. 2.

According to one embodiment of the present disclosure, as shown in FIG. 1 to FIG. 3, the force-bearing fitting face of the first screw thread is provided with the stopper.

The force-bearing fitting face of the second thread may be formed into a flat surface, a curved surface or into other shapes, and the stopper may be formed on the force-bearing fitting face of the first thread. When tightening the anti-loosening screw pair 100, the stopper may press against the force-bearing fitting face of the second thread such that the latter is deformed, which causes meshing engagement between the first thread and the second thread on their force-bearing fitting faces so as to prevent the radial displacement in the anti-loosening screw pair 100.

Optionally, in some specific embodiments of the present disclosure, as shown in FIG. 2 and FIG. 3, the stopper comprises a protrusion 30 protruding toward the force-bearing fitting face of the second screw thread, the protrusion 30 presses against the force-bearing fitting face of the second screw thread as the first screw component 10 and the second screw component 20 are being screwed together so as to form a groove 40 therein, and the protrusion 30 is engaged with the groove 40 so as to prevent the radial displacement between the first screw component 10 and the second screw component 20.

The stopper may be provided with the protrusion 30, and the protrusion 30 may protrude toward the force-bearing fitting face of the second screw thread. As the first screw component 10 and second screw component 20 are being screwed together, the protrusion 30 may press against the force-bearing fitting face of the second screw thread so that the latter is concavely deformed so as to form the groove 40 therein. The protrusion 30 may engaged with the groove 40 to prevent the radial displacement between the first screw component 10 and the second screw component 20.

According to one embodiment of the present disclosure, the stopper may comprise only one protrusion 30.

As shown in FIG. 1, one protrusion 30 may be formed on the force-bearing fitting face of the first screw thread, and the object of preventing the radial displacement between the first screw component 10 and the second screw component 20 can therefore be achieved by only providing one protrusion 30.

In some specific embodiments of the present disclosure, the stopper may comprise a plurality of protrusions 30.

As shown in FIG. 2 and FIG. 3, the plurality of protrusions 30 may be formed on the force-bearing fitting face of the first screw thread and may be spaced apart thereon so as to be evenly distributed or unevenly distributed, and there is no limitation on the location and the quantity of the protrusions 30. The distribution of the protrusions 30 on the force-bearing fitting face may either be periodical or non-periodical, all the designs thereof will be effective as long as they can prevent the radial displacement in the anti-loosening screw pair 100, and shall also fall within the protection scope of the anti-loosening screw pair 100 according to the embodiments of the present disclosure.

Optionally, according to one embodiment of the present disclosure, an end face of the protrusion 30 comprises an arcuate shape or an angular shape.

As shown in FIG. 1 to FIG. 3, the end face of the protrusion 30 may comprise an arcuate shape or an angular shape. As a matter of course, the protrusion 30 may comprise varied shapes, for example, a single arc, a sharp angle or others, and the specific shape of the protrusion 30 may also be a combination of multiple different shapes, all the shape designs will be effective as long as they can prevent the radial displacement in the anti-loosening screw pair 100, and shall also fall within the protection scope of the anti-loosening screw pair 100 according to the embodiments of the present disclosure.

According to one embodiment of the present disclosure, one of the internal and external threads adopts a conventional thread profile, and the other one includes a convex feature. When the screw pair is tightened, the convex feature presses against a surface of a corresponding screw thread so that the surface is concavely deformed, the convex feature and the concavely deformed region come into contact with each other, and at which location the fitted faces are formed into force-bearing fitting faces. The meshing engagement between the convex feature and the concavely deformed region achieve the object of preventing the radial displacement in the screw pair. The shape of the convex feature relating to the present embodiment may have varied shapes, for example, an arcuate shape, a sharp angular shape or others, and may also be a combination of multiple shapes. This design has no limitation on the shape of the convex feature, and all the designs thereof will be effective as long as they can prevent the radial displacement.

In addition, there is no limitation on the location and the quantity of the convex feature on the thread fitting face according to the present embodiment, and all the designs of the periodically or non-periodically arranged convex feature will be effectively employed as long as they can prevent the radial displacement.

In some other specific embodiments of the present disclosure, as shown in FIG. 4 to FIG. 15, the first screw component 10 and the second screw component 20 are provided with the stopper respectively.

The force-bearing fitting faces of the first screw component 10 and the second screw component 20 may be provided with the stopper respectively, and through engagement of the stopper of the first screw component 10 with the stopper of the second screw component 20, the radial displacement in the anti-loosening screw pair 100 can be effectively prevented.

According to one embodiment of the present disclosure, the stopper includes a first fitting portion arranged on the thread fitting face of the first screw component 10 and a second fitting portion arranged on the thread fitting face of the second screw component 20, and the first fitting portion is engaged with the second fitting portion so as to prevent the radial displacement between the first screw component 10 and the second screw component 20.

The stopper mainly includes the first fitting portion formed on the thread fitting face of the first screw component 10 and the second fitting portion formed on the thread fitting face of the second screw component 20, and the first fitting portion may engaged with the second fitting portion so as to prevent the radial displacement between the first screw component 10 and the second screw component 20.

In some specific embodiments of the present disclosure, as shown in FIG. 4 to FIG. 9, the first fitting portion comprises a protrusion 30 arranged on the first screw thread, the second fitting portion comprises a groove 40 arranged in the second screw thread, and the protrusion 30 is clipped into the groove 40.

With the first fitting portion comprises the protrusion 30 on the first screw thread and the second fitting portion comprises the groove 40 in the second screw thread, the protrusion 30 may be clipped into the groove 40, and the meshing engagement between the protrusion 30 an the groove 40 may produce a restraining effect on the radial displacement in the anti-loosening screw pair 100.

Figure 10:
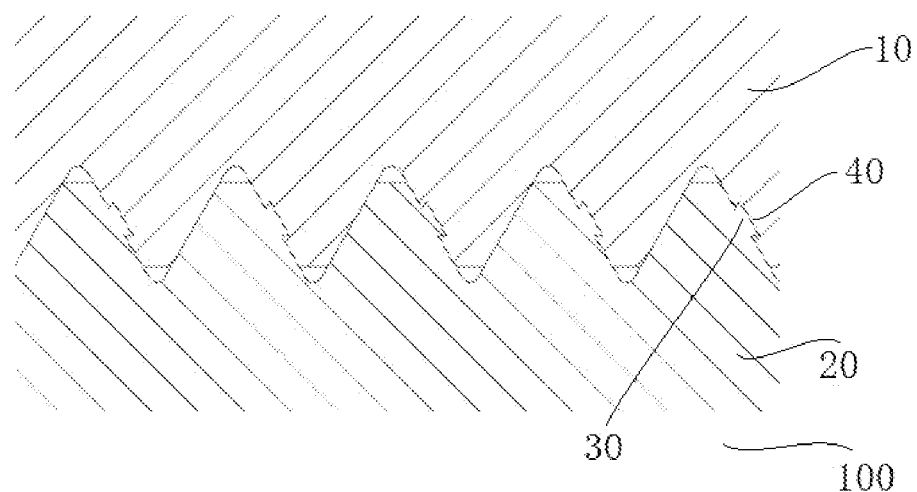
FIG. 10 is another sectional view of the anti-loosening screw pair according to the second embodiment of the present disclosure.
Figure 11:
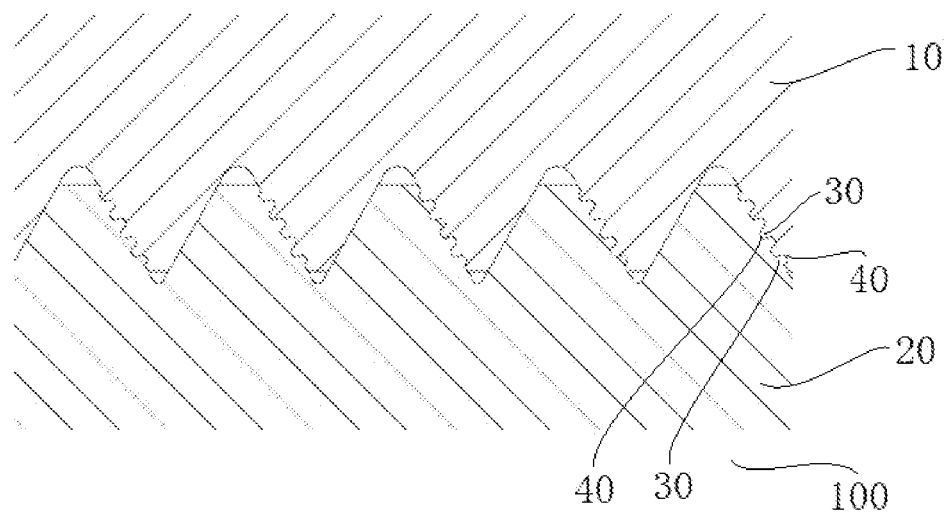
FIG. 11 is another sectional view of the anti-loosening screw pair according to the second embodiment of the present disclosure.
Figure 12:
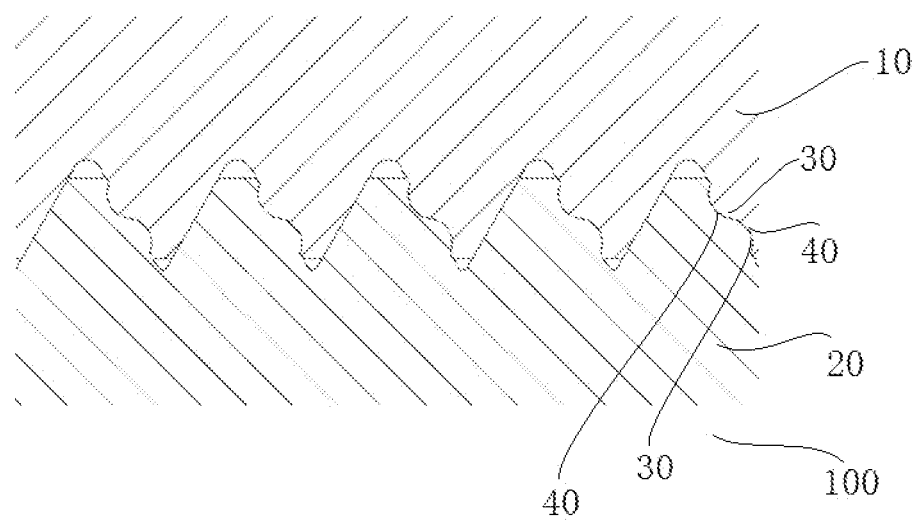
FIG. 12 is another sectional view of the anti-loosening screw pair according to the second embodiment of the present disclosure.
Figure 13:
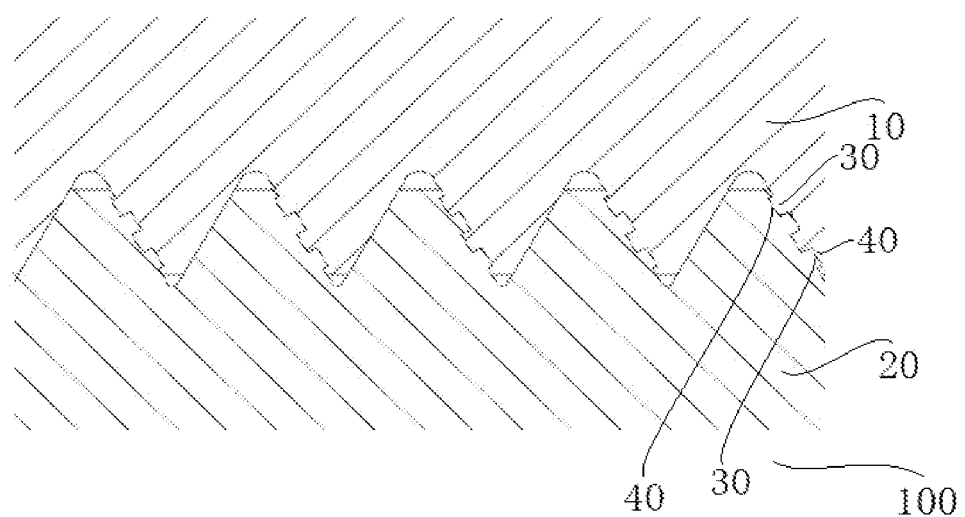
FIG. 13 is yet another sectional view of the anti-loosening screw pair according to the second embodiment of the present disclosure.
Figure 14:
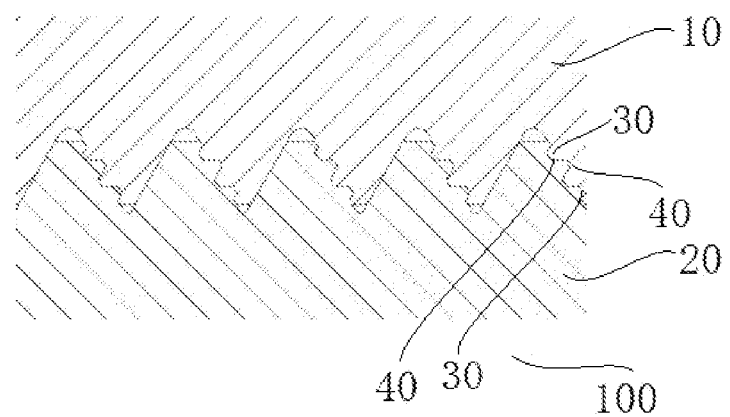
FIG. 14 is still another sectional view of the anti-loosening screw pair according to the second embodiment of the present disclosure.

In some other specific embodiments of the present disclosure, specifically as shown in FIG. 10, the first fitting portion comprises a groove 40 arranged in the first screw thread, the second fitting portion comprises a protrusion 30 arranged on the second screw thread, and the protrusion 30 is clipped into the groove 40.

With the first fitting portion comprises the groove 40 in the first screw thread and the second fitting portion comprises the protrusion 30 on the second screw thread, the protrusion 30 may be snapped into the groove 40, and the meshing engagement between the protrusion 30 and the groove 40 may produce a restraining effect on the radial displacement in the anti-loosening screw pair 100.

According to one embodiment of the present disclosure, the stopper may comprise only one protrusion 30.

Figure 8:
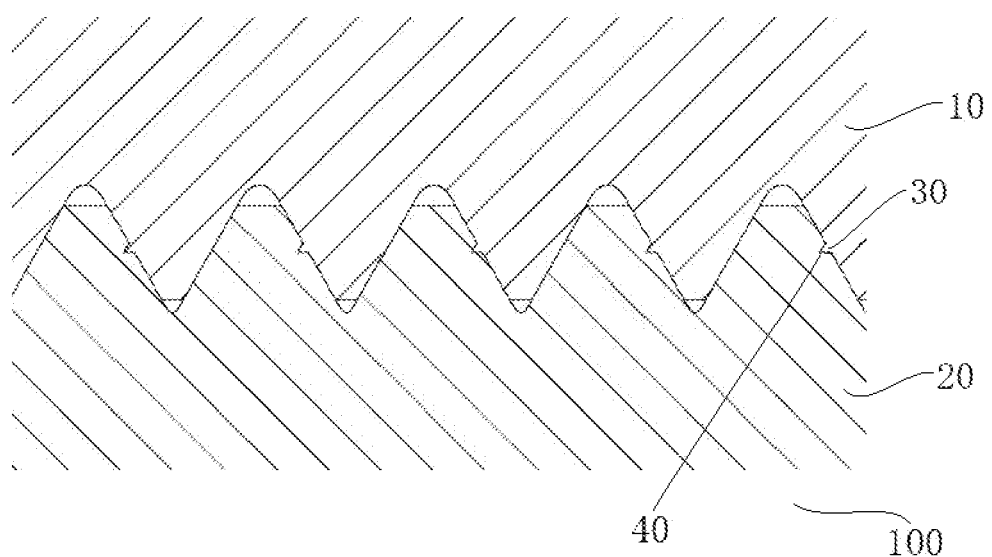
FIG. 8 is another sectional view of the anti-loosening screw pair according to the second embodiment of the present disclosure.

As shown in FIG. 8, one protrusion 30 may be formed on the force-bearing fitting face of the first screw thread, while one groove 40 engaged therewith may be formed in the force-bearing fitting face of the second screw thread. Alternatively, specifically as shown in FIG. 10, one protrusion 30 may be formed on the force-bearing fitting face of the second screw thread, while one groove 40 engaged therewith may be formed in the force-bearing fitting face of the first screw thread. An object of preventing the radial displacement between the first screw component 10 and the second screw component 20 can therefore be achieved by only providing one protrusion 30 on the force-bearing fitting face of the first screw thread and one groove 40 in the second screw thread.

In some specific embodiments of the present disclosure, the stopper may comprise a plurality of protrusions 30 and grooves 40.

Figure 4:
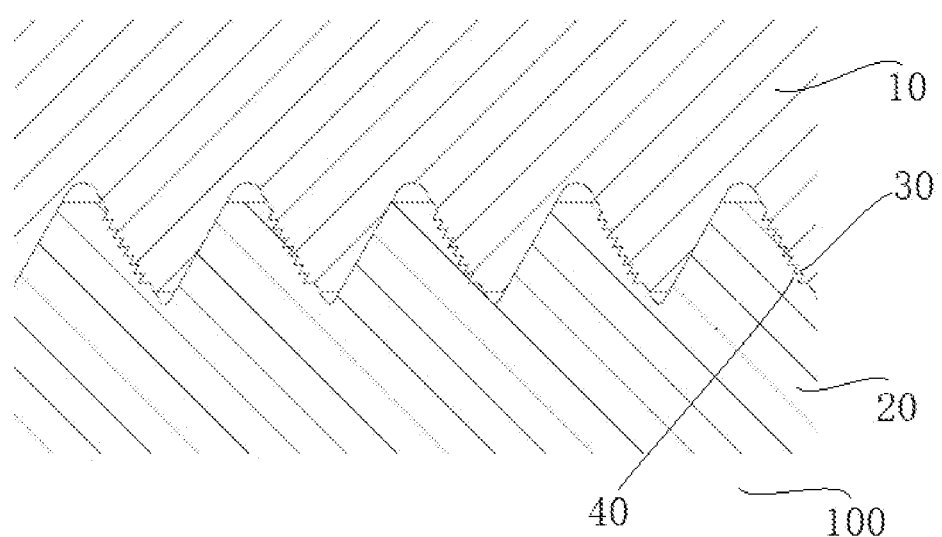
FIG. 4 is a sectional view of an anti-loosening screw pair according to a second embodiment of the present disclosure.
Figure 5:
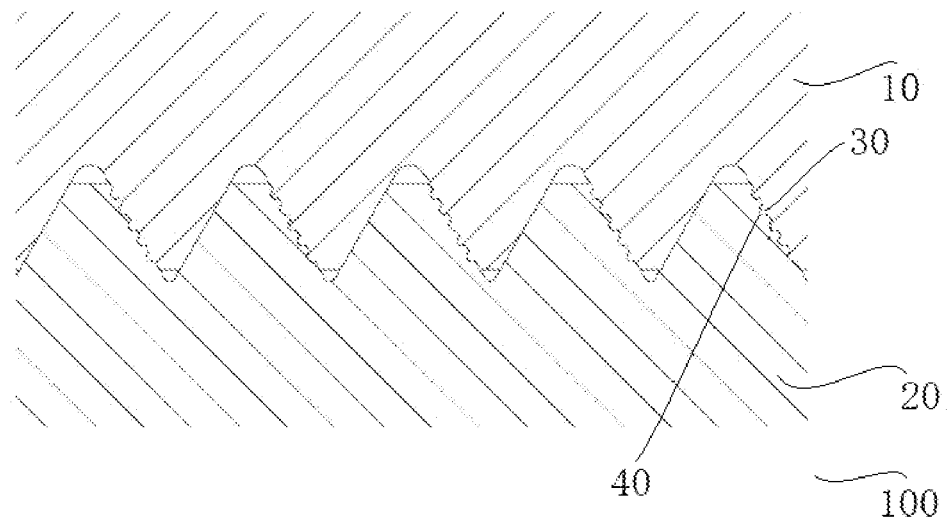
FIG. 5 is another sectional view of the anti-loosening screw pair according to the second embodiment of the present disclosure.
Figure 6:
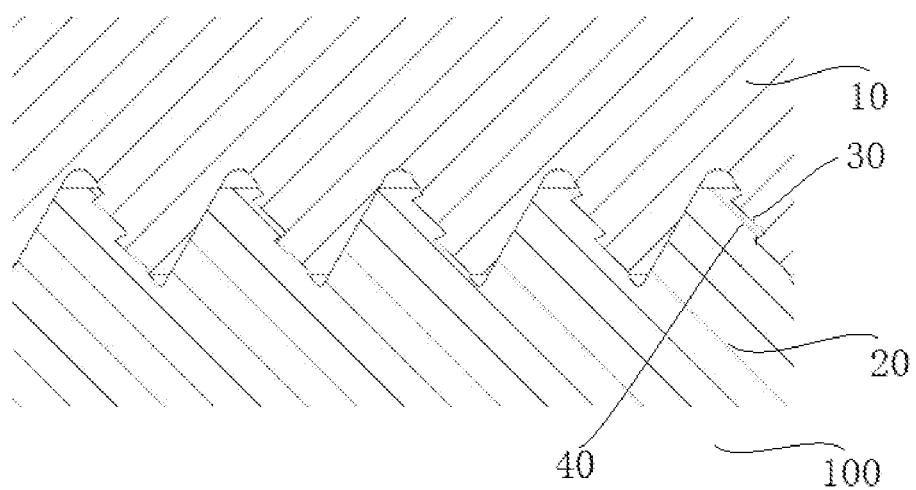
FIG. 6 is another sectional view of the anti-loosening screw pair according to the second embodiment of the present disclosure.
Figure 7:
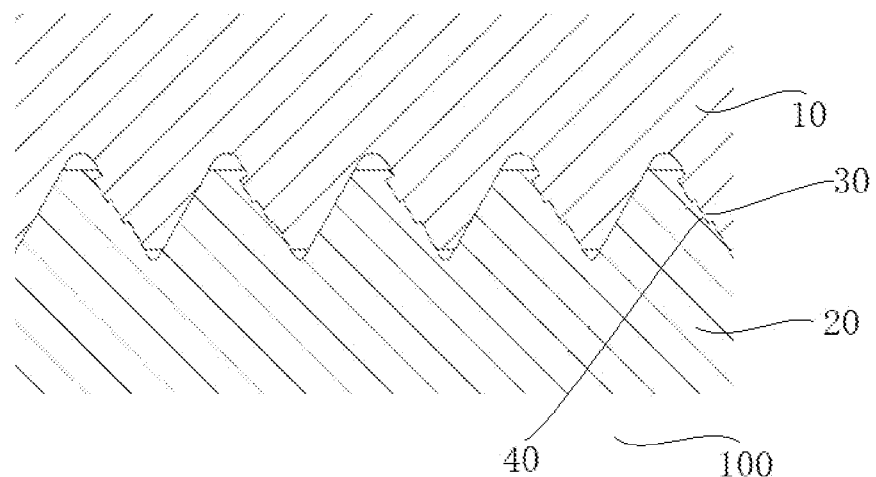
FIG. 7 is another sectional view of the anti-loosening screw pair according to the second embodiment of the present disclosure.
Figure 9:
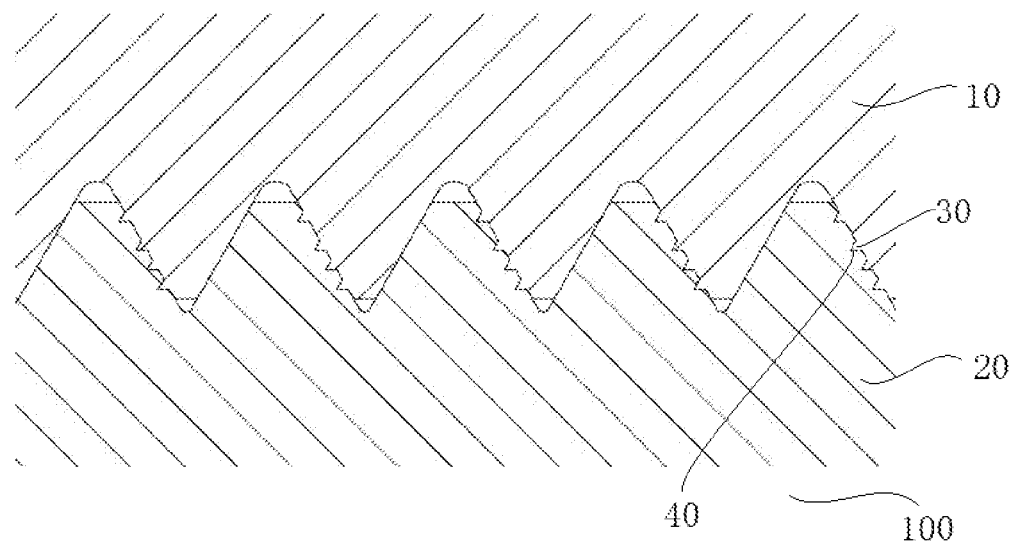
FIG. 9 is another sectional view of the anti-loosening screw pair according to the second embodiment of the present disclosure.

As shown in FIG. 4, FIG. 5 and FIG. 9, a plurality of protrusions 30 of same or different sizes may be formed on the force-bearing fitting face of the first screw thread, and a plurality of grooves 40, which are engaged with the protrusions 30 respectively, may be formed in the force-bearing fitting face of the second screw thread. Alternatively, a plurality of protrusions 30 of same or different sizes may be formed on the force-bearing fitting face of the second screw thread, and a plurality of grooves 40, which are engaged with the protrusions 30 respectively, may be formed in the force-bearing fitting face of the first screw thread. There is no limitation on the location and the quantity of protrusions 30 and the grooves 40, the distributions of the protrusions 30 and the grooves 40 on the force-bearing fitting faces may either be periodical or non-periodical, all the designs thereof will be effective as long as they can prevent the radial displacement in the anti-loosening screw pair 100, and shall also fall within the protection scope of the anti-loosening screw pair 100 according to the embodiments of the present disclosure.

In some other specific embodiments of the present disclosure, as shown in FIG. 11 to FIG. 15, the first fitting portion of the first screw thread may include both the protrusion 30 and the groove 40, and the second fitting portion of the second thread may also include both the groove 40 and protrusions 30, which are engaged with the protrusion 30 and the groove 40 of the first fitting portion respectively.

The first fitting portion may be provided with the protrusion 30 and the groove 40 on and in the first screw thread, and the second fitting portion may be provided with the groove 40 and the protrusion 30 in and on the second screw thread. The protrusion 30 on the first screw thread may be clipped into the groove 40 in the second screw thread, the protrusion 30 on the second screw thread may also be clipped into the groove 40 in the first screw thread, and the meshing engagement between the protrusions 30 and the grooves 40 of the first screw thread and the second screw thread may produce a restraining effect on the radial displacement in the anti-loosening screw pair 100. There is no limitation on the location and the quantity of the protrusions 30 and grooves 40 of the first screw thread and the second screw thread, the distributions of the protrusions 30 and grooves 40 on the force-bearing fitting faces may either be periodical or non-periodical, all the designs thereof will be effective as long as they can prevent the radial displacement in the anti-loosening screw pair 100, and shall also fall within the protection scope of the anti-loosening screw pair 100 according to the embodiments of the present disclosure.

According to one embodiment of the present disclosure, a fitting clearance 70 is presented between the protrusion 30 and the groove 40 engaged therewith.

Figure 15:
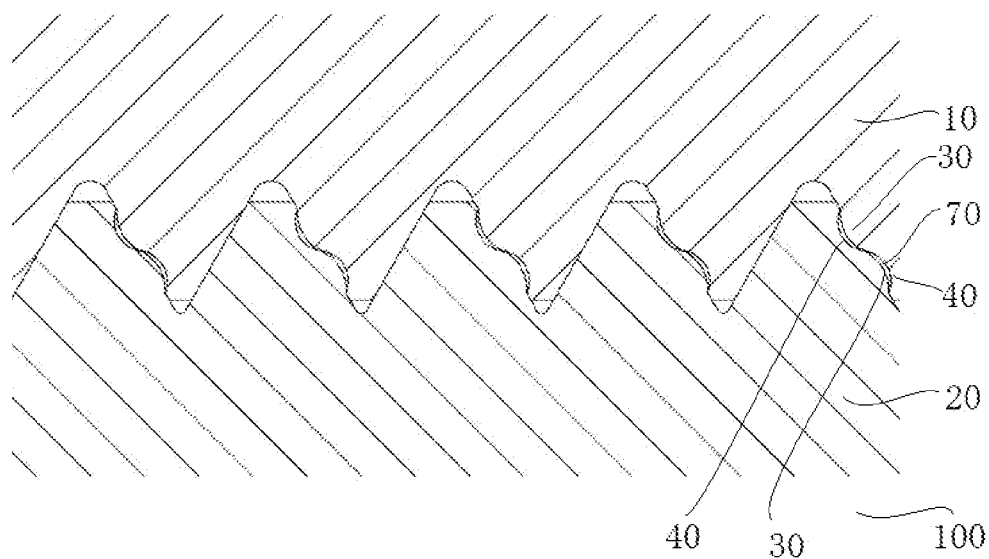
FIG. 15 is a sectional view of the anti-loosening screw pair according to a third embodiment of the present disclosure.

As shown in FIG. 15, the size of the protrusion 30 may not be identical with that of the groove 40 engaged therewith, so that the fitting clearance 70 is presented therebetween when the protrusion 30 is engaged with the groove 40.

Optionally, in some specific embodiments of the present disclosure, a shape of the protrusion 30 corresponds to that of the groove 40 engaged therewith, and the protrusion 30 is closely engaged with the groove 40.

The shape of the protrusion 30 and that of the groove 40 engaged therewith may correspond to each other, and the protrusion 30 may closely engaged with the groove 40.

According to one embodiment of the present disclosure, each of the protrusion 30 and the groove 40 comprises a triangular, rectangular, trapezoidal, curved, hook-like, folded or irregular shape.

As shown in FIG. 4 to FIG. 15, each of the protrusion 30 and the groove 40 may comprise a triangular, rectangular, trapezoidal, curved, hook-like, folded or irregular shape, and the shape of each of the protrusion 30 and the groove 40 may also be a combination of multiple different shapes. All the shape designs of the protrusion 30 and the groove 40 will be effective as long as they can prevent the radial displacement in the anti-loosening screw pair 100, and shall also fall within the protection scope of the anti-loosening screw pair 100 according to the embodiments of the present disclosure.

According to one embodiment of the present disclosure, the internal screw thread and the external screw thread respectively includes a convex feature and a concave feature to be meshed together (i.e., one includes a convex feature, and the other includes a corresponding concave feature), or respectively includes both a convex feature and a concave feature to be meshed together (i.e., the internal screw thread includes both a convex feature and a concave feature, and the external screw thread includes both another concave feature and another convex feature corresponding to the internal screw thread). The convex feature and the concave feature are called convex-concave features for short, and meshing engagement between the convex-concave features on the internal and external screw threads may produce a restraining effect on the radial displacement. The convex-concave features relating to the present embodiment may have varied shapes, for example, a triangular, rectangular, trapezoidal, curved, hook-like, folded or irregular shape, and may also be a combination of multiple shapes. This design method has no limitation on the shapes of the convex-concave features, and all the shape designs will be effective as long as they can prevent the radial displacement.

The convex-concave features relating to the present embodiment should be able to bear the main interaction force between the internal and external threads, therefore the force-bearing fitting face will be presented in a region where the convex-concave features are located. A geometric dimension of the convex feature may be identical to or differ from that of the concave feature engaged therewith, in the case that they are different, a discontinuous contact region may be formed between the internal screw thread and the external screw thread, but this does not depart from the core principle of the design method provided by the present disclosure, that is, all the designs will be effective as long as they can prevent the radial displacement in the screw pair.

In addition, there is no limitation on the location and the quantity of the convex-concave features relating to the present embodiment on the thread fitting faces, the convex-concave features may either be periodically arranged or non-periodically arranged, and all the designs thereof will be effective as long as they can prevent the radial displacement in the anti-loosening screw pair 100.

In some specific embodiments of the present disclosure, the first fitting portion comprises a first stepped portion 50 arranged on the first screw component 10, and the second fitting portion comprises a second stepped portion 60 arranged on the second screw component 20. Through engagement between the first stepped portion 50 and the second stepped portion 60, the radial displacement in the anti-loosening screw pair 100 can be effectively prevented.

Figure 16:
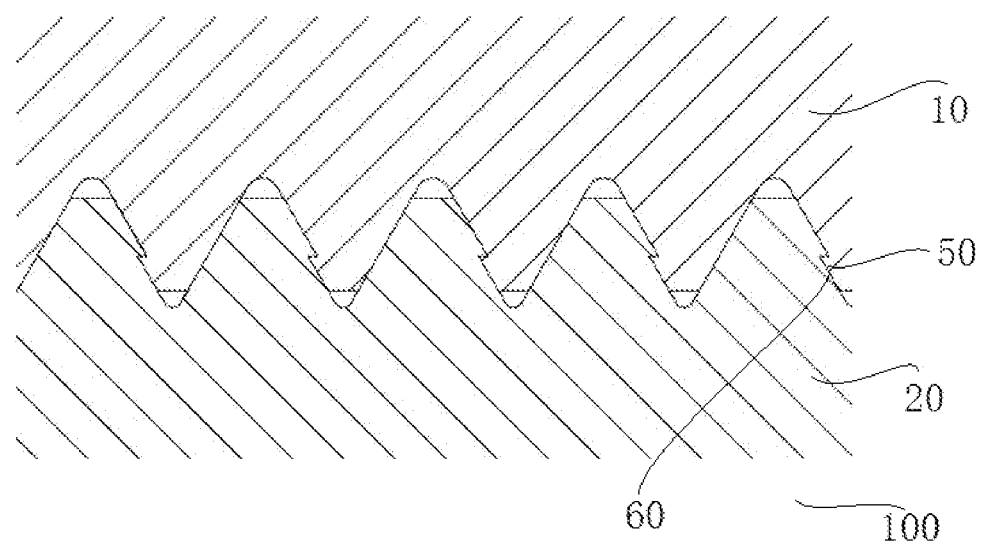
FIG. 16 is a sectional view of an anti-loosening screw pair according to a fourth embodiment of the present disclosure.
Figure 17:
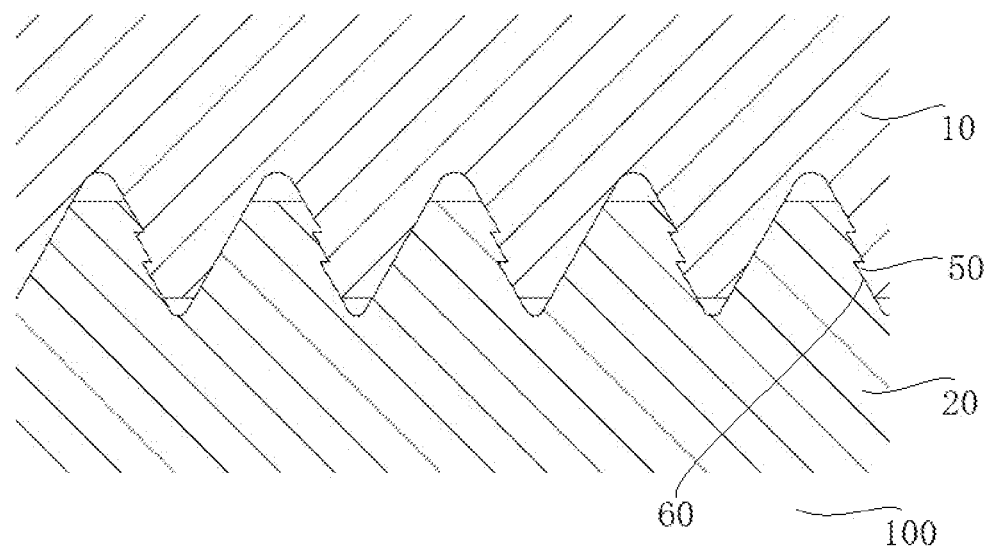
FIG. 17 is another sectional view of the anti-loosening screw pair according to the fourth embodiment of the present disclosure.
Figure 18:
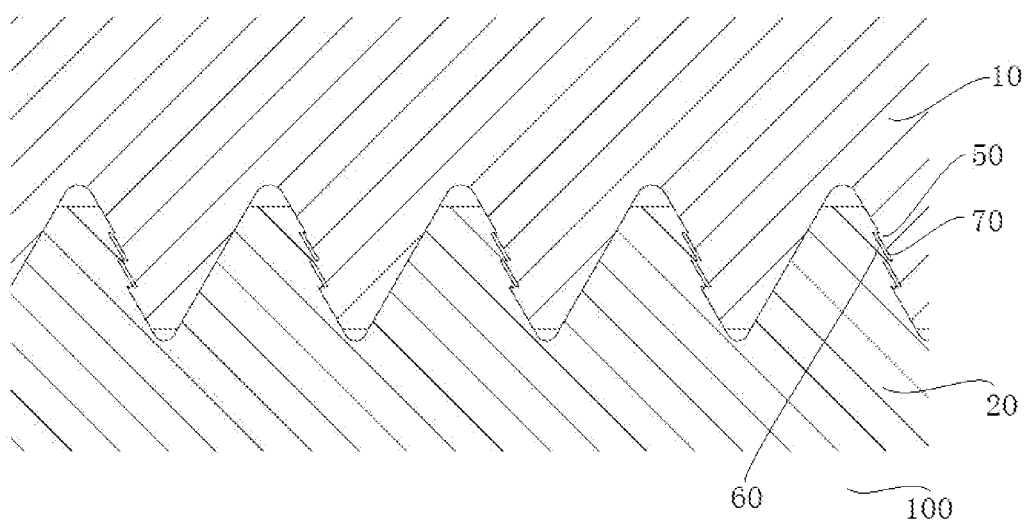
FIG. 18 is yet another sectional view of the anti-loosening screw pair according to the fourth embodiment of the present disclosure.

As shown in FIG. 16 to FIG. 18, the first stepped portion 50 may be comprise a stepped shape, the second stepped portion 60 may also comprise a corresponding stepped shape, and a restraining effect on the radial displacement in the anti-loosening screw pair 100 may be produced through meshing engagement between the first stepped portion 50 and the second stepped portion 60.

Optionally, in some specific embodiments of the present disclosure, the first fitting portion may comprise one or more first stepped portions 50, and a plurality of first stepped portions 50 may be spaced apart on the first fitting portion so as to be evenly or unevenly distributed. Also, the second fitting portion may comprise one or more second stepped portions 60, and a plurality of second stepped portions 60 may be spaced apart on the second fitting portion so as to be evenly or unevenly distributed.

As shown in FIG. 16 and FIG. 17, one or more first stepped portions 50 can be provided on the first fitting portion and they can be spaced apart thereon so as to be evenly or unevenly distributed. Further, one or more second stepped portions 60 can be provided on the second fitting portion and they can be spaced apart thereon so as to be evenly or unevenly distributed. Through the meshing engagement between the first stepped portions 50 and the second stepped portions 60, the radial displacement in the anti-loosening screw pair 100 can be effectively prevented.

According to one embodiment of the present disclosure, a fitting clearance 70 may be presented between the first stepped portion 50 and the second stepped portion 60.

As shown in FIG. 18, size of the first stepped portion 50 may not be identical to that of the second stepped portion 60, so that the fitting clearance 70 is presented therebetween as the first stepped portion 50 is engaged with the second stepped portion 60.

Optionally, in some specific embodiments of the present disclosure, a shape of the first stepped portion 50 is corresponding to that of the second stepped portion 60 so that they are closely engaged with each other.

The shape of the first stepped portion 50 and that of the second stepped portion 60 may correspond to each other, and the first stepped portion 50 may closely engaged with the second stepped portion 60.

According to one embodiment of the present disclosure, the internal screw thread and the external screw thread respectively include stepped features which are meshed with each other, and the meshing engagement between the stepped features may produce a restraining effect on the radial displacement. This design method has no limitation on the specific shape of the stepped feature, and all the designs thereof will be effective as long as they can prevent the radial displacement.

Since the stepped feature relating to the present embodiment should be able to bear the main interaction force between the internal and external threads, the force-bearing fitting faces will be found in a region where the stepped features are located. A geometric dimension of the stepped feature on the internal screw thread may be identical to or differ from that of the stepped feature on the external screw thread, in the case that they are different, a discontinuous contact region may be formed between the internal screw thread and the external screw thread, but this does not depart from the core principle of the design method produced by the present disclosure, that is, all the designs will be effective as long as they can prevent the radial displacement in the screw pair.

In addition, there is no limitation on the location and the quantity of the stepped features relating to the present embodiment on the thread fitting faces, the stepped feature may be a single step, and may also be a plurality of periodical or non-periodical arranged steps, and all the designs thereof will be effective as long as they can prevent the radial displacement.

In some specific embodiments of the present disclosure, the non-force-bearing fitting region of the first screw component 10 and/or the second screw component 20 is provided with the stopper.

The stopper may be formed in the non-force-bearing fitting region of the first screw component 10, and may also be formed in the non-force-bearing fitting region of the second screw component 20. The stoppers may also be formed in the non-force-bearing fitting regions of the first screw component 10 and the second screw component 20 simultaneously to effectively prevent the radial displacement from being produced when the anti-loosening screw pair 100 is tightened. There is no limitation on the shape and the quantity of the stoppers formed in the non-force-bearing fitting regions, and all the designs thereof will be effective as long as they can prevent the radial displacement. The shape and the quantity of the stoppers formed in the non-force-bearing fitting regions may be similar to that on the force-bearing fitting faces.

Figure 19:
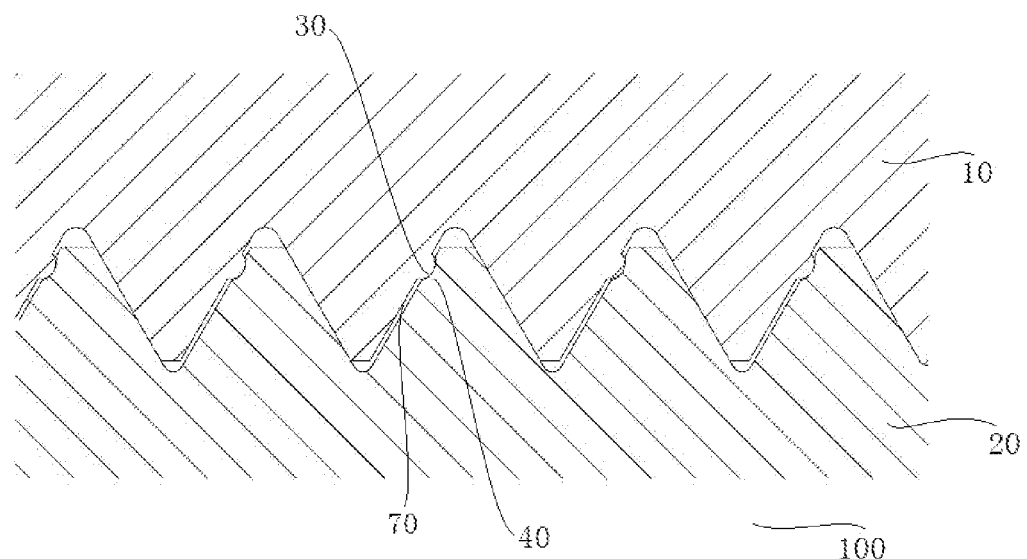
FIG. 19 is a sectional view of an anti-loosening screw pair according to a fifth embodiment of the present disclosure.

According to one embodiment of the present disclosure, as shown in FIG. 19, non-force-bearing fitting regions of the first screw component 10 and of the second screw component 20 are provided with the stopper respectively.

The stoppers may be formed in the non-force-bearing fitting regions of the first screw component 10 and the second screw component 20 respectively, and through engagement between the stopper of the first screw component 10 and the stopper of the second screw component 20, the radial displacement in the anti-loosening screw pair 100 may be effectively prevented.

In some specific embodiments of the present disclosure, the stopper includes a third fitting portion arranged in the non-force-bearing fitting region of the first screw component 10 and a fourth fitting portion arranged in the non-force-bearing fitting region of the second screw component 20, and the third fitting portion is engaged with the fourth fitting portion so as to prevent the radial displacement between the first screw component 10 and the second screw component 20.

The third fitting portion may comprise a protrusion 30 arranged on the first screw thread, the fourth fitting portion may comprise a groove 40 arranged in the second screw thread, and the protrusion 30 is clipped into the groove 40.

The third fitting portion may also comprise a groove 40 arranged in the first screw thread, the fourth fitting portion may also comprise a protrusion 30 arranged on the second screw thread, and the protrusion 30 is clipped into the groove 40.

The third fitting portion may also comprise both a protrusion 30 and a groove 40 arranged on and in the first screw thread, and the fourth fitting portion may also comprise both a groove 40 and a protrusion 30 arranged in and on the second screw thread. The protrusion 30 of the first screw thread is clipped into the groove 40 of the second screw thread, and the protrusion 30 of the second screw thread is clipped into the groove 40 of the first screw thread.

The stopper may include the third fitting portion formed in the non-force-bearing fitting region of the first screw component 10 and a fourth fitting portion formed in the non-force-bearing fitting region of the second screw component 20, and the third fitting portion may engaged with the fourth fitting portion so as to prevent the radial displacement between the first screw component 10 and the second screw component 20.

The specific designs of the third fitting portion and the fourth fitting portion may be approximately similar to that of the previously described first fitting portion and second fitting portion.

The design of the third fitting portion in the non-force-bearing fitting region may be approximately similar to that of the first fitting portion on the force-bearing fitting face, and the design of the fourth fitting portion in the non-force-bearing fitting region may be approximately similar to that of the second fitting portion on the force-bearing fitting face. There is no definite limitation on the specific designs of the third fitting portion and the fourth fitting portion, and all the designs thereof will be effective as long they can prevent the radial displacement between the first screw component 10 and the second screw component 20.

In some specific embodiments of the present disclosure, as shown in FIG. 19, the third fitting portion comprises the protrusion 30 arranged on the first screw thread, the fourth fitting portion comprises the groove 40 arranged in the second screw thread, and the protrusion 30 is clipped into the groove 40.

The third fitting portion may comprise the protrusion 30 on the first screw thread, the fourth fitting portion may comprise the groove 40 in the second screw thread, the protrusion 30 may be clipped into the groove 40, and the meshing engagement between the protrusion 30 and the groove 40 may produce a restraining effect on the radial displacement in the anti-loosening screw pair 100.

In some specific embodiments of the present disclosure, the force-bearing fitting face and the non-force-bearing fitting region of the first screw component 10 and/or second screw component 20 are provided with the stopper respectively.

The force-bearing fitting face and the non-force-bearing fitting region of the first screw component 10 may comprise the stopper simultaneously, and the force-bearing fitting face and the non-force-bearing fitting region of the second screw component 20 may comprise the stopper simultaneously. The force-bearing fitting faces and the non-force-bearing fitting regions of the first screw component 10 and the second screw component 20 may simultaneously comprise the stoppers to effectively prevent the radial displacement from being generated when the anti-loosening screw pair 100 is tightened.

Figure 20:
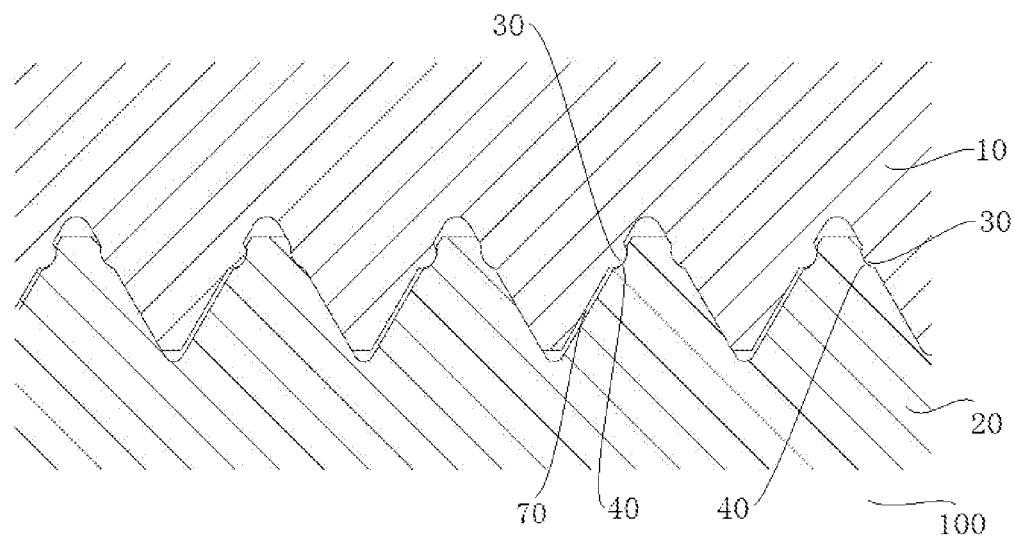
FIG. 20 is a sectional view of an anti-loosening screw pair according to a sixth embodiment of the present disclosure.

In some specific embodiments of the present disclosure, as shown in FIG. 20, the force-bearing fitting faces and the non-force-bearing fitting regions of the first screw component 10 and the second screw component 20 are provided with the stopper respectively.

In FIG. 20, the stopper may be formed on the force-bearing fitting faces of the first screw component 10 and the second screw component 20 respectively. By forming the stoppers on the force-bearing fitting faces and the non-force-bearing fitting regions of the first screw component 10 and the second screw component 20 respectively, the stoppers on the force-bearing fitting faces comprise the first fitting portion and the second fitting portion respectively, and the stoppers in the non-force-bearing fitting regions comprise the third fitting portion and the fourth fitting portion respectively. The first fitting portion may comprise the protrusion 30 on the first screw thread, the second fitting portion may comprise the groove 40 in the second screw thread, the third fitting portion may comprise the protrusion 30 on the first screw thread, the fourth fitting portion may comprise the groove 40 on the second screw thread, and the protrusions 30 and the groove 40 on and in the force-bearing fitting faces and the non-force-bearing fitting regions may be meshed with each other to further restrain the radial displacement of the anti-loosening screw pair 100 from occurring in use.

In some specific embodiments of the present disclosure, the respective cross sections of the first screw thread and the second screw thread are approximately formed into triangular, trapezoidal, rectangular or zigzag shapes on which the respective stoppers are provided.

Although the respective cross sections of the first screw thread and the second screw thread may be approximately formed into triangular, trapezoidal, rectangular or zigzag shapes on which the respective stoppers are provided, the specific shapes of the first screw thread and the second screw thread are not limited to the above-described shapes. All the shape designs thereof will be effective as long as a restraining effect can be exerted on the radial displacement in the anti-loosening screw pair 100, and shall all fall within the protection scope of the anti-loosening screw pair 100 according to the embodiments of the present disclosure.

In general, by arranging the stopper on at least one of the force-bearing fitting faces and the non-force-bearing fitting regions of the first screw component 10 and the second screw component 20, the anti-loosening screw pair 100 according to the embodiments of the present disclosure effectively prevents the radial displacement between the first screw component 10 and the second screw component 20 so as to increase connection tightness of the anti-loosening screw pair 100. The anti-loosening screw pair 100 is therefore easy to be disassembled, convenient for repeatedly usage, and has high fatigue strength, appropriate tightening torque as well as a broad application range.

An anti-loosening screw component according to a second aspect of the present disclosure will be described specifically hereinafter on the basis of the anti-loosening screw pair 100 according to the above embodiments.

The anti-loosening screw component according to the second aspect of the present disclosure includes both the first screw component 10 provided with the stopper and the second screw component 20 provided with the stopper in the anti-loosening screw pair 100 according to the above embodiments. The anti-loosening screw component may consist of the first screw component 10 provided with the stopper, and may also consist of the second screw component 20 provided with the stopper. Optionally, in the case that the anti-loosening screw component consists of the first screw component 10, the force-bearing fitting face and/or the non-force-bearing fitting region of the first screw component 10 is provided with the stopper, and in the case that the anti-loosening screw component consists of the second screw component 20, the force-bearing fitting face and/or the non-force-bearing fitting region of the second screw component 20 is provided with the stopper.

If the first screw component 10 and the second screw component 20 comprised in the above anti-loosening screw pair 100 are provided with the above stoppers, then each of which is called an anti-loosening screw component and fall within the protection scope of the present disclosure. It should be noted that, the anti-loosening screw component may be a complete part including a thread feature (an internal thread or an external thread), such as a screw nut, a screw cap, a bolt, a screw nail etc., and may also be a partial region on a complex structure including the thread feature (the internal thread or the external thread), such as a partial region on an engine cylinder block provided with an internal thread, or an end region on an engine spindle provided with an external thread etc.

The anti-loosening screw component consists of the first screw component 10 and the anti-loosening screw component consists of the second screw component 20 may be used in sets to compose the anti-loosening screw pair 100 according to the embodiment of the present disclosure. The anti-loosening screw component consists of the first screw component 10 and the anti-loosening screw component consists of the second screw component 20 may also be individually used as anti-loosening structures respectively.

According to one embodiment of the present disclosure, the first screw component 10 including the protrusion 30 (provided on the force-bearing fitting face and/or in the non-force-bearing fitting region) may comprise an individual screw nut structure, which may constitute an anti-loosening screw component, and may engaged with an ordinary bolt so as to prevent radial displacement between the bolt and the screw nut by the stopper on the screw nut. The first screw component 10 shown in FIG. 1 to FIG. 3 is an example of the anti-loosening screw component conforming to this embodiment.

In some specific embodiments of the present disclosure, the second screw component 20 including the protrusion 30 (provided on the force-bearing fitting face and/or in the non-force-bearing fitting region) may comprise an individual bolt structure, which may constitute an anti-loosening screw component, and may engaged with an ordinary screw nut so as to prevent radial displacement between the bolt and the screw nut by the stopper on the bolt.

Optionally, according to one embodiment of the present disclosure, the second screw component 20 including the protrusion 30 and/or the groove 40 (provided on the force-bearing fitting face and/or the non-force-bearing fitting region) may also comprise an individual tapping thread structure. The individual tapping thread structure may constitute the anti-loosening screw component, and may be directly screwed into a portion to be installed (such as wood, plastic, metallic material, wall etc.) to form an internal thread feature inside the portion (in such a case, the portion to be installed served as the first screw component) approximately through pressing effect and the like which is engaged with the external thread on the tapping thread structure, in such a case, the stopper on the tapping thread structure may functioned to prevent radial displacement between the self-tapping thread structure and the portion to be installed, thus ensuring stability of the installation.

Both of the first screw component 10 provided with the stopper and the second screw component 20 provided with the stopper in the above anti-loosening screw pair 100 may constitute the anti-loosening screw component, and the specific structures thereof are identical with that in the related description of the above anti-loosening screw pair 100, which will not be repeated herein.

The anti-loosening screw pair 100 according to the present disclosure will be described hereinafter by referring to the accompanying drawings in conjunction with some specific embodiments. As shown in FIG. 1 to FIG. 3, an anti-loosening screw pair 100 in a first embodiment is mainly composed of a first screw component 10 and a second screw component 20. The first screw component 10 is provided with an inner hole, and a first screw thread extending along its spiral line may be formed on the inner wall surface of the inner hole. The second screw component 20 may be provided with an approximately rod shape, and a second screw thread extending along its spiral line may be formed on the outer wall surface of the second screw component 20 and corresponding to the first screw thread. In the first embodiment, the first screw component 10 is screwed to the left with respect to the second screw component 20 to form force-bearing fitting faces and non-force-bearing fitting regions thereon.

The force-bearing fitting face of the second screw thread may be formed into a flat surface, a curved surface or other shapes, a stopper may be formed on the force-bearing fitting face of the first screw thread and comprise a protrusion 30 protruding toward the force-bearing fitting face of the second screw thread. The first screw thread may have one or more protrusions 30, and the shape of the protrusion 30 may be of an arc or a sharp angle. In the process of the anti-loosening screw pair 100 being tightened, the protrusion 30 may press against the force-bearing fitting face of the second screw thread such that the latter is deformed, which ensures meshing engagement between the first screw thread and the second screw thread on their force-bearing fitting faces to achieve an object of restraining the radial displacement between the force-bearing fitting faces of the anti-loosening screw pair 100. As shown in FIG. 4 to FIG. 14, the main structure of an anti-loosening screw pair 100 in a second embodiment is basically identical with that of the above first embodiment. In the second embodiment, a first screw component 10 is tightened to the left with respect to a second screw component 20 to form force-bearing fitting faces and non-force-bearing fitting regions thereon. Both the force-bearing fitting faces of the first screw thread and the second screw thread are provided with stoppers, i.e., a first fitting portion and a second fitting portion respectively, wherein the first fitting portion may comprise a protrusion 30 on the first screw thread, the second fitting portion may comprise a groove 40 in the second screw thread, and one or more protrusions 30 and one or more grooves 40 may be provided. The protrusion 30 may have a triangular, rectangular, trapezoidal, curved, hook-like, folded or irregular shape, and the shape of the protrusion 30 may also be a combination of multiple shapes. In addition, in FIGS. 11 to 14, the first fitting portion may comprise both a protrusion 30 and a groove 40 on the first screw thread, the second fitting portion may comprise both a groove 40 and a protrusion 30 on the second screw thread, the protrusion 30 on the first screw thread may be clipped into the groove 40 in the second screw thread, and the protrusion 30 on the second screw thread may also be clipped into the groove 40 in the first screw thread. As a matter of course, all of the specific shapes of the protrusion 30 will be effective as long as they can prevent the radial displacement in the anti-loosening screw pair 100, and shall all fall within the protection scope of the anti-loosening screw pair 100 according to the embodiment of the present disclosure. As shown in FIG. 15, the main structure of an anti-loosening screw pair 100 according to a third embodiment is basically identical with that of the above embodiments. In the third embodiment, a first screw component 10 is tightened to the left with respect to a second screw component 20 to form force-bearing fitting faces and non-force-bearing fitting regions thereon. A first fitting portion may comprise both a protrusion 30 and a groove 40 on the first screw thread, a second fitting portion may comprise both a groove 40 and a protrusion 30 on the second screw thread, the protrusion 30 on the first screw thread may be clipped into the groove 40 in the second screw thread, and the protrusion 30 on the second screw thread may also be clipped into the groove 40 in the first thread, to prevent radial displacement in the anti-loosening screw pair 100. The size of the protrusion 30 may be different from that of the groove 40, so that a fitting clearance 70 is presented therebetween when they are engaged with each other. As shown in FIG. 16 to FIG. 18, the main structure of an anti-loosening screw pair 100 according to a fourth embodiment is basically identical with that of the above embodiments. In the fourth embodiment, a first screw component 10 is tightened to the left with respect to a second screw component 20 to form force-bearing fitting faces and non-force-bearing fitting regions thereon. A first fitting portion comprises a first stepped portion 50 on the first screw component, and a second fitting portion comprises a second stepped portion 60 on the second screw component 20. The first stepped portion 50 may comprise a step-like shape and there may be one or more first stepped portions 50, the first stepped portions 50 are engaged with the second stepped portions 60 so as to prevent radial displacement in the anti-loosening screw pair 100. The respective sizes of the first stepped portions 50 may be identical or different, and the first stepped portions 50 may also engaged with the second stepped portions 60 to form a fitting clearance 70 therebetween. As shown in FIG. 19, the main structure of an anti-loosening screw pair 100 according to a fifth embodiment is basically identical with that of the above embodiments. In the fifth embodiment, a first screw component 10 is tightened to the left with respect to a second screw component 20 to form force-bearing fitting faces and non-force-bearing fitting regions thereon. Non-force-bearing fitting regions of the first screw component 10 and the second screw component 20 are provided with stoppers, i.e., a third fitting portion and a fourth fitting portion respectively, wherein the third fitting portion may comprise a protrusion 30 on the first screw thread and the fourth fitting portion may comprise a groove 40 in the second screw thread. Through engagement between the stoppers of the first screw component 10 and of the second screw component 20, radial displacement in the anti-loosening screw pair 100 may be effectively prevented. As shown in FIG. 20, the main structure of an anti-loosening screw pair 100 according to a sixth embodiment is basically identical with that of the above embodiments. In the sixth embodiment, a first screw component 10 is tightened to the left with respect to a second screw component 20 to form force-bearing fitting faces and non-force-bearing fitting regions thereon, and force-bearing fitting faces and the non-force-bearing fitting regions of the first screw component 10 and the second screw component 20 are provided with stoppers, the stoppers on the force-bearing fitting faces referred to a first fitting portion and a second fitting portion respectively, and the stoppers on the non-force-bearing fitting regions are referred to a third fitting portion and a fourth fitting portion respectively. The first fitting portion may comprise a protrusion 30 on the first screw thread, the second fitting portion may comprise a groove 40 in the second screw thread, the third fitting portion may comprise a protrusion 30 on the first screw thread, the fourth fitting portion may comprise a groove 40 in the second screw thread, and the protrusions 30 and the grooves 40 on the force-bearing fitting faces and the non-force-bearing fitting regions may be meshed with each other to effectively prevent radial displacement in the anti-loosening screw pair 100.

All of the first screw components 10 and the second screw components 20 provided with the stopper in the above first to sixth embodiments may serve as examples of the anti-loosening screw component according to the present disclosure.

The above are merely the preferred embodiments of the present disclosure, it should be noted that, a person skilled in the art may make improvements and modifications without departing from the principle of the present disclosure, and these improvements and modifications shall also fall within the protection scope of the present disclosure.

What is claimed is:

1. A screw pair, comprising:
   a first screw component having an inner hole, an inner wall surface of the inner hole being provided with a first screw thread extending along a spiral line thereof; and
   a second screw component having a rod-shaped structure, an outer wall surface of the rod-shaped structure being provided with a second screw thread extending along a spiral line thereof and corresponding to the first screw thread, and the second screw component being in threaded connection with the first screw component,
   wherein in a direction of the first screw component being screwed onto the second screw component, sides of the first screw thread and the second screw thread pressing against each other are formed into force-bearing fitting faces respectively, opposite sides thereof are formed into non-force-bearing fitting regions respectively,
   wherein a first stopper is provided on the force-bearing fitting face of the first screw thread, and the first stopper continuously extends from one end of the first screw thread to the other end of the first screw thread along the spiral line of the first screw thread;
   wherein a second stopper is provided on the force-bearing fitting face of the second screw thread, and the second stopper continuously extends from one end of the second screw thread to the other end of the second screw thread along the spiral line of the second screw thread; and
   wherein the first stopper is engaged with the second stopper, so as to prevent radial displacement between the first screw component and the second screw component.

2. The screw pair according to claim 1, wherein a third stopper is provided on the non-force-bearing fitting region of the first screw thread, and the third stopper continuously extends from one end of the first screw thread to the other end of the first screw thread along the spiral line of the first screw thread;
   wherein a fourth stopper is provided on the non-force-bearing fitting region of the second screw thread, and the fourth stopper continuously extends from one end of the second screw thread to the other end of the second screw thread along the spiral line of the second screw thread; and
   wherein the third stopper is engaged with the fourth stopper so as to prevent radial displacement between the first screw component and the second screw component.

3. The screw pair according to claim 2, wherein the third stopper comprises one or multiple third stepped portions arranged on the first screw component, and the fourth stopper correspondingly comprises one or multiple fourth stepped portions arranged on the second screw component.

4. The screw pair according to claim 2, wherein the third stopper comprises one or more protrusions arranged on the first screw thread, the fourth stopper correspondingly comprises one or more grooves arranged in the second screw thread, and the protrusion is engaged with the groove; or
   wherein the third stopper comprises one or more grooves arranged in the first screw thread, the fourth stopper correspondingly comprises one or more protrusions arranged on the second screw thread, and the protrusion is engaged with the groove; or
   wherein the third stopper comprises one or more protrusions arranged on the first screw thread and one or more grooves arranged in the first screw thread, the fourth stopper correspondingly comprises one or more grooves arranged in the second screw thread and one or more protrusions arranged on the second screw thread, the protrusion on the first screw thread is engaged with the groove in the second screw thread, and the protrusion on the second screw thread is engaged with the groove in the first screw thread.

5. The screw pair according to claim 4, wherein a fitting clearance is presented between the protrusion and the groove engaged therewith, or
   wherein a shape of the protrusion corresponds to that of the groove engaged therewith and the protrusion is closely engaged with the groove.

6. The screw pair according to claim 1, wherein the first stopper comprises one or multiple first stepped portions arranged on the first screw component, and the second stopper correspondingly comprises one or multiple second stepped portions arranged on the second screw component.

7. The screw pair according to claim 6, wherein the multiple first stepped portions are spaced apart so as to be evenly distributed, and the multiple second stepped portions are spaced apart so as to be evenly distributed; or
   wherein the multiple first stepped portions are spaced apart so as to be unevenly distributed, and the multiple second stepped portions are spaced apart so as to be unevenly distributed.

8. The screw pair according to claim 6, wherein a geometric dimension of a stepped feature of the first stepped portion is identical to a geometric dimension of a stepped feature of the second stepped portion; or
   wherein a geometric dimension of a stepped feature of the first stepped portion differs from a geometric dimension of a stepped feature of the second stepped portion, so that a discontinuous contact region is formed therebetween.

9. The screw pair according to claim 1, wherein the first stopper comprises one or more protrusions arranged on the first screw thread, the second stopper correspondingly comprises one or more grooves arranged in the second screw thread, and the protrusion is engaged with the groove; or
- wherein the first stopper comprises one or more grooves arranged in the first screw thread, the second stopper correspondingly comprises one or more protrusions arranged on the second screw thread, and the protrusion is engaged with the groove; or
- wherein the first stopper comprises one or more protrusions arranged on the first screw thread and one or more grooves arranged in the first screw thread, the second stopper correspondingly comprises one or more grooves arranged in the second screw thread and one or more protrusions arranged on the second screw thread, the protrusion on the first screw thread is engaged with the groove in the second screw thread, and the protrusion on the second screw thread is engaged with the groove in the first screw thread.

10. The screw pair according to claim 9, wherein a fitting clearance is presented between the protrusion and the groove engaged therewith, or
- wherein a shape of the protrusion corresponds to that of the groove engaged therewith and the protrusion is closely engaged with the groove.

11. A screw component, which is an internal screw component or an external screw component, comprising a screw thread, wherein the screw component can engage with another screw component to form an screw pair, and the other screw component comprises another screw thread,
- wherein in a direction of the screw component being screwed onto the other screw component, sides of the screw thread and the other screw thread pressing against each other are formed into force-bearing fitting faces respectively, opposite sides thereof are formed into non-force-bearing fitting regions respectively,
- wherein a stopper is provided on the force-bearing fitting face of the screw thread, and the stopper continuously extends from one end of the screw thread to the other end of the screw thread along the spiral line of the screw thread;
- wherein another stopper is provided on the force-bearing fitting face of the other screw thread, and the other stopper continuously extends from one end of the other screw thread to the other end of the other screw thread along the spiral line of the other screw thread; and
- wherein the stopper is engaged with the other stopper so as to prevent radial displacement between the screw component and the other screw component.

12. The screw component according to claim 11, wherein the stopper comprises one or multiple stepped portions arranged on the screw component, and the another stopper correspondingly comprises one or multiple another stepped portions arranged on the another screw component.

13. The screw component according to claim 12, wherein the multiple stepped portions are spaced apart so as to be evenly distributed, and the multiple another stepped portions are spaced apart so as to be evenly distributed; or
- wherein the multiple stepped portions are spaced apart so as to be unevenly distributed, and the multiple another stepped portions are spaced apart so as to be unevenly distributed.

14. The screw component according to claim 12, wherein a geometric dimension of a stepped feature of the stepped portion is identical to a geometric dimension of a stepped feature of the another stepped portion; or
- wherein a geometric dimension of a stepped feature of the stepped portion differs from a geometric dimension of a stepped feature of the another stepped portion, so that a discontinuous contact region is formed therebetween.

15. The screw component according to claim 11, wherein the stopper comprises one or more protrusions arranged on the screw thread, the another stopper correspondingly comprises one or more grooves arranged in the another screw thread, and the protrusion is engaged with the groove; or
- wherein the stopper comprises one or more grooves arranged in the screw thread, the another stopper correspondingly comprises one or more protrusions arranged on the another screw thread, and the protrusion is engaged with the groove; or
- wherein the stopper comprises one or more protrusions arranged on the screw thread and one or more grooves arranged in the screw thread, the another stopper correspondingly comprises one or more grooves arranged in the another screw thread and one or more protrusions arranged on the another screw thread, the protrusion on the screw thread is engaged with the groove in the another screw thread, and the protrusion on the another screw thread is engaged with the groove in the screw thread.

16. The screw component according to claim 11, wherein an extra stopper is provided on the non-force-bearing fitting region of the screw thread, and the extra stopper continuously extends from one end of the screw thread to the other end of the screw thread along the spiral line of the screw thread;
- wherein an another extra stopper is provided on the non-force-bearing fitting region of the another screw thread, and the another extra stopper continuously extends from one end of the another screw thread to the other end of the another screw thread along the spiral line of the another screw thread; and
- wherein the extra stopper is engaged with the another extra stopper so as to prevent radial displacement between the screw component and the another screw component.

17. The screw component according to claim 16, wherein the extra stopper comprises one or multiple extra stepped portions arranged on the screw component, and the another extra stopper correspondingly comprises one or multiple another extra stepped portions arranged on the another screw component.

18. The screw component according to claim 16, wherein the extra stopper comprises one or more protrusions arranged on the screw thread, the another extra stopper correspondingly comprises one or more grooves arranged in the another screw thread, and the protrusion is engaged with the groove; or
- wherein the extra stopper comprises one or more grooves arranged in the screw thread, the another extra stopper correspondingly comprises one or more protrusions arranged on the another screw thread, and the protrusion is engaged with the groove; or
- wherein the extra stopper comprises one or more protrusions arranged on the screw thread and one or more grooves arranged in the screw thread, the another extra stopper correspondingly comprises one or more grooves arranged in the another screw thread and one or more protrusions arranged on the another screw thread, the protrusion on the screw thread is engaged with the groove in the another screw thread, and the protrusion on the another screw thread is engaged with the groove in the screw thread.

* * * * *